US012576829B2

(12) United States Patent
Valente et al.

(10) Patent No.: US 12,576,829 B2
(45) Date of Patent: Mar. 17, 2026

(54) ARRANGEMENT FOR ELECTRIC POWER CONVERSION AND ELECTRIC DRIVE

(71) Applicant: Huawei Technologies Co., Ltd.,
Shenzhen (CN)

(72) Inventors: Mauro Valente, Nuremberg (DE);
**Piniwan Thiwanka Bandara
Wijekoon, Nuremberg (DE); Francisco
Daniel Freijedo Fernández**,
Nuremberg (DE)

(73) Assignee: **HUAWEI TECHNOLOGIES CO.,
LTD.**, Shenzhen (CN)

( * ) Notice: Subject to any disclaimer, the term of this
patent is extended or adjusted under 35
U.S.C. 154(b) by 430 days.

(21) Appl. No.: 18/322,148

(22) Filed: May 23, 2023

(65) Prior Publication Data

US 2023/0294660 A1 Sep. 21, 2023

Related U.S. Application Data

(63) Continuation of application No.
PCT/EP2020/083126, filed on Nov. 24, 2020.

(51) Int. Cl.
H02P 27/04 (2016.01)
B60W 20/10 (2016.01)
(52) U.S. Cl.
CPC .................................... B60W 20/10 (2013.01)
(58) Field of Classification Search
CPC .......... H02P 27/06; H02P 25/18; H02P 6/085;
H02P 27/08; G05B 15/02
See application file for complete search history.

(56) References Cited

U.S. PATENT DOCUMENTS

| | | | |
|---|---|---|---|
| 5,099,186 | A | 3/1992 | Rippel et al. |
| 8,847,555 | B2 | 9/2014 | Loudot et al. |

(Continued)

FOREIGN PATENT DOCUMENTS

| | | |
|---|---|---|
| CN | 103427456 A | 12/2013 |
| CN | 102826054 B | 12/2014 |

(Continued)

OTHER PUBLICATIONS

You Shuai,et al, "An Integrated Electrolytic Capacitorless Onboard
Charger for Electric Vehicles," IEEE Energy Conversion Congress
and Exposition (ECCE), 2018, 6 pages.

(Continued)

*Primary Examiner* — Karen Masih
(74) *Attorney, Agent, or Firm* — Conley Rose, P.C.

(57) ABSTRACT

An arrangement for electric power conversion and an elec-
tric drive comprises a power converter that includes three
legs, an electric motor including three open-end stator
windings respectively having first and second ends, and a
power switch. The first ends of the stator windings are
coupled to respective legs of the three legs of the power
converter, and the second ends of the stator windings are
coupled together and have a same electric potential. The
power switch is configured to selectively disconnect one of
the second ends of the stator windings from all other second
ends to establish at most two distinct electric potentials. The
at most two distinct electric potentials are coupled to respec-
tive legs of a power grid interface coupled to the arrange-
ment.

20 Claims, 12 Drawing Sheets

(56) References Cited

U.S. PATENT DOCUMENTS

| 2012/0286740 | A1 | 11/2012 | Loudot et al. |
| 2013/0307333 | A1 | 11/2013 | Jang et al. |
| 2016/0236579 | A1 | 8/2016 | Yim et al. |
| 2023/0369879 | A1* | 11/2023 | Prasad .................... B60L 53/14 |

FOREIGN PATENT DOCUMENTS

| CN | 106712601 A | 5/2017 |
| CN | 209666872 U | 11/2019 |
| KR | 20200064652 A | 6/2020 |

OTHER PUBLICATIONS

Walter Lhomme et al,. "Integrated Traction/Charge/Air Compression Supply Using Three-Phase Split-Windings Motor for Electric Vehicles," IEEE Transactions on Power Electronics, vol. 33, No. 11, Nov. 2018, 10 pages, XP011688765.

* cited by examiner

ARRANGEMENT FOR ELECTRIC POWER CONVERSION AND ELECTRIC DRIVE

CROSS-REFERENCE TO RELATED APPLICATIONS

This is a continuation of International Patent Application No. PCT/EP2020/083126 filed on Nov. 24, 2020, which is hereby incorporated by reference in its entirety.

TECHNICAL FIELD

The disclosure relates to electric charging in electric vehicle (EV) applications. The disclosure provides, to this end, an arrangement for electric power conversion and electric drive, a method of operating the same, and a system comprising the same.

BACKGROUND

Most of EV architectures rely on physically separate charging and traction functions realized by an on-board charger (OBC) and a traction converter/inverter, respectively. As the name suggests, the OBC is on-board all the time, requires dedicated space, needs to be carried within the car and fails to provide any added functionality while the car is moving. This implies high capital expenditure (CAPEX) and operational expenditure (OPEX).

However, charging and drive functions of EVs are usually not in use simultaneously. Exemplary attempts of combining the charging and drive functions together in the same hardware imply a number of major limitations.

For example, fully integrated solutions are limited in functionality and operation. This makes an EV system inflexible and does not address the range anxiety of a majority of EV users. Charging from a three-phase grid is achieved by means of additional non-shared converters, or by employing more than one electric motor or with the use of multi-phase machines. In some other cases, charging from a three-phase grid generates torque. Evidently, this is detrimental for efficiency, lifetime of the mechanical parts and produces noise and vibration.

SUMMARY

In view of the above-mentioned adverse issues, it is necessary to reduce an overall size and cost of a system for electric charging and traction drive in an electric vehicles application, regardless of single-phase or three-phase charging operation.

This objective is achieved by the embodiments as defined by the appended independent claims. Further embodiments are set forth in the dependent claims and in the following description and drawings.

A first aspect of the disclosure provides an arrangement for electric power conversion and electric drive. The arrangement comprises a power converter comprising three legs, an electric motor including three open-end stator windings respectively having first and second ends, and a power switch. The first ends of the stator windings are connected to respective legs of the three legs of the power converter, and the second ends of the stator windings are connected together and have a same electric potential. The power switch is configured to selectively disconnect one of the second ends of the stator windings from all other of the second ends to establish at most two distinct electric potentials. The established at most two distinct electric potentials of the second ends of the stator windings are connectable to respective legs of a power grid interface connectable to the arrangement.

A power converter as used herein may refer to a device that is capable of converting electric energy from one form to another, such as converting between alternating current (AC) and direct current (DC) and/or vice versa, changing a voltage or frequency, or some combination of these. In particular, power converters may comprise switched-mode power converters.

A stator as used herein may refer to a stationary part of a rotary system, such as an electric motor. In an electric motor, the stator may comprise a number of windings to provide a rotating magnetic field that drives a rotor.

A power switch as used herein may refer to a switch that is designed for high-voltage and/or high-current applications. In particular, power switches may comprise power semiconductor devices.

According to an implementation of the first aspect, the arrangement further comprises an inductor having first and second ends. The first end of the inductor is connectable to a further leg of the power converter, and the second end of the inductor is connectable to a further leg of the power grid interface.

An inductor as used herein may refer to a passive electrical component that is capable of storing energy in a magnetic field when electric current flows through it. An inductor is characterized by its inductance, which is the ratio of the voltage across the inductor to the rate of change of the inductor current.

This configuration enables a charging mode of the EV in connection with a three-phase power grid without producing any torque, making use of all the power electronics already existing for the traction system and the motor inductances. This saves space and increases power density, efficiency and reliability.

According to an implementation of the first aspect, the inductor has a same inductance as the stator windings.

This configuration provides a reasonable trade-off in view of the different modes of operation of the arrangement.

According to an implementation of the first aspect, the power switch is configured to disconnect one of the second ends of the stator windings from all other of the second ends to establish two distinct electric potentials. The established two distinct electric potentials of the second ends of the stator windings are connectable to the respective legs of the power grid interface.

This configuration enables a charging mode of the EV in connection with a single-phase power grid.

According to an implementation of the first aspect, the power switch is configured to disconnect none of the second ends of the stator windings from all other of the second ends to establish a single electric potential.

According to an implementation of the first aspect, the established single electric potential of the second ends of the stator windings is connectable to one of the respective legs of the power grid interface.

This configuration enables a further charging mode of the EV in connection with a single-phase power grid.

According to an implementation of the first aspect, the power converter is configured to regulate an electric parameter on a demand side of the power converter.

This configuration enables a bidirectional operation of the power converter and the arrangement. As such, the arrangement is able to charge an energy storage, such as a battery, from the power grid, and to use the stored electric power to produce torque. Moreover, the arrangement is able to return the stored electric power to the power grid, if needed.

According to an implementation of the first aspect, the established single electric potential of the second ends of the stator windings is not connected to the respective legs of the power grid interface.

This configuration enables a traction mode of the EV.

According to an implementation of the first aspect, the power converter is operable according to a direct torque control, field-oriented control, model predictive control, or open-loop control strategy, and is configured to regulate a torque of the electric motor according to a torque reference.

A torque as used herein may refer to a rotational equivalent of a linear force, produced by an electric motor to affect a propulsion of an EV.

These configurations improve a customizability to various EV requirements.

According to an implementation of the first aspect, the arrangement further comprises a further power switch that is configured to connect the second end of the inductor with the established single electric potential of the second ends of the stator windings.

This configuration extends the possibilities of connection in traction mode, by reduction of Common Mode current and an increase of fault tolerance.

According to an implementation of the first aspect, the power converter is configured to perform AC/AC power conversion. The first ends of the stator windings may be connected to the respective legs of an AC side of the power converter.

Alternatively, the power converter is configured to perform AC/DC power conversion. The first ends of the stator windings may be connected to the respective legs of the AC side of the power converter.

These configurations improve a customizability to various EV requirements.

According to an implementation of the first aspect, the power converter comprises a parallel connection of at least three independently controlled half-bridges providing the respective legs of the power converter.

This configuration enables a modular multi-cell architecture of the power converter.

According to an implementation of the first aspect, the power converter comprises a parallel connection of at least three independently controlled two-level (2 L) half-bridges.

This configuration based on 2 L half-bridges providing two DC voltage levels implies low complexity.

According to an implementation of the first aspect, the power converter comprises a parallel connection of at least three independently controlled n-level (nL) half-bridges. A number n of levels exceeds two.

This configuration based on nL half-bridges providing additional DC voltage levels reduces a loss and stress of switching components, and is particularly suitable for high-voltage applications.

According to an implementation of the first aspect, the arrangement is connectable to the power grid interface comprising an electromagnetic interference filter and an all-pole grid cutoff switch providing the respective legs of the power grid interface.

This configuration improves electromagnetic interference (EMI) suppression and a safety of operation in charging modes of the EV.

According to an implementation of the first aspect, the electric motor is an induction motor or a permanent magnet synchronous machine.

An asynchronous (or induction) motor as used herein may refer to an AC-driven electric motor in which an electric current in the rotor needed to produce torque is obtained by electromagnetic induction from a magnetic field of the stator winding(s). In other words, the induction motor must rotate slightly slower than the AC cycles in order to induce the electric current in the rotor winding.

A synchronous motor as used herein may refer to an AC-driven electric motor in which, at steady state, a rotation of the rotor is synchronized with a frequency of the supply current, and a rotation period is exactly equal to an integral number of AC cycles. In other words, the synchronous motor rotates at a rate locked to the line frequency. A permanent-magnet synchronous motor uses permanent magnets embedded in the rotor to create a constant magnetic field.

These configurations improve a customizability to various EV requirements.

A second aspect of the disclosure provides a system. The system comprises an arrangement according to the first aspect or any of its embodiments, a power grid interface connected to the electric motor of the arrangement, an energy storage interface connected to the power converter of the arrangement, and an energy storage connected to the energy storage interface.

The system enables charging the energy storage of an EV, such as a battery, from the power grid, using the stored electric power to produce torque, and even returning the stored electric power to the power grid, if needed.

A third aspect of the disclosure provides a method of operating an arrangement for electric power conversion and electric drive. The arrangement comprises a power converter comprising three legs, an electric motor including three open-end stator windings respectively having first and second ends, and a power switch. The second ends of the stator windings are connected together and have a same electric potential, and the power switch is configured to selectively disconnect one of the second ends of the stator windings from the star configuration to establish at most two distinct electric potentials. The method comprises connecting the first ends of the stator windings to respective legs of the three legs of the power converter, selectively disconnecting one of the second ends of the stator windings from all other of the second ends to establish at most two distinct electric potentials, and connecting the established at most two distinct electric potentials of the second ends of the stator windings to respective legs of a power grid interface connectable to the arrangement.

This enables a charging mode of the EV in connection with a three-phase power grid without producing any torque, making use of all the power electronics already existing for the traction system and the motor inductances. This saves space and increases power density, efficiency and reliability.

According to an implementation of the third aspect, the method further comprises utilizing the arrangement according to the first aspect or any of its embodiments.

As a consequence, the above-mentioned device features and the associated advantages also apply in connection with the method according to the third aspect by analogy.

A fourth aspect of the disclosure provides a computer program comprising a program code for carrying out the method according to the second aspect or any of its embodiments when implemented on a processor or processor circuitry of the arrangement according to the first aspect or any of its embodiments.

It is noted that all devices, elements, units and means described in the disclosure could be implemented in the software or hardware elements or any kind of combination thereof. All steps which are performed by the various entities described in the disclosure as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects will be explained in the following description of various embodiments in relation to the enclosed drawings.

DETAILED DESCRIPTION OF EMBODIMENTS

Figure 1:
FIG. 1 illustrates an exemplary EV architecture.
Figure 1:
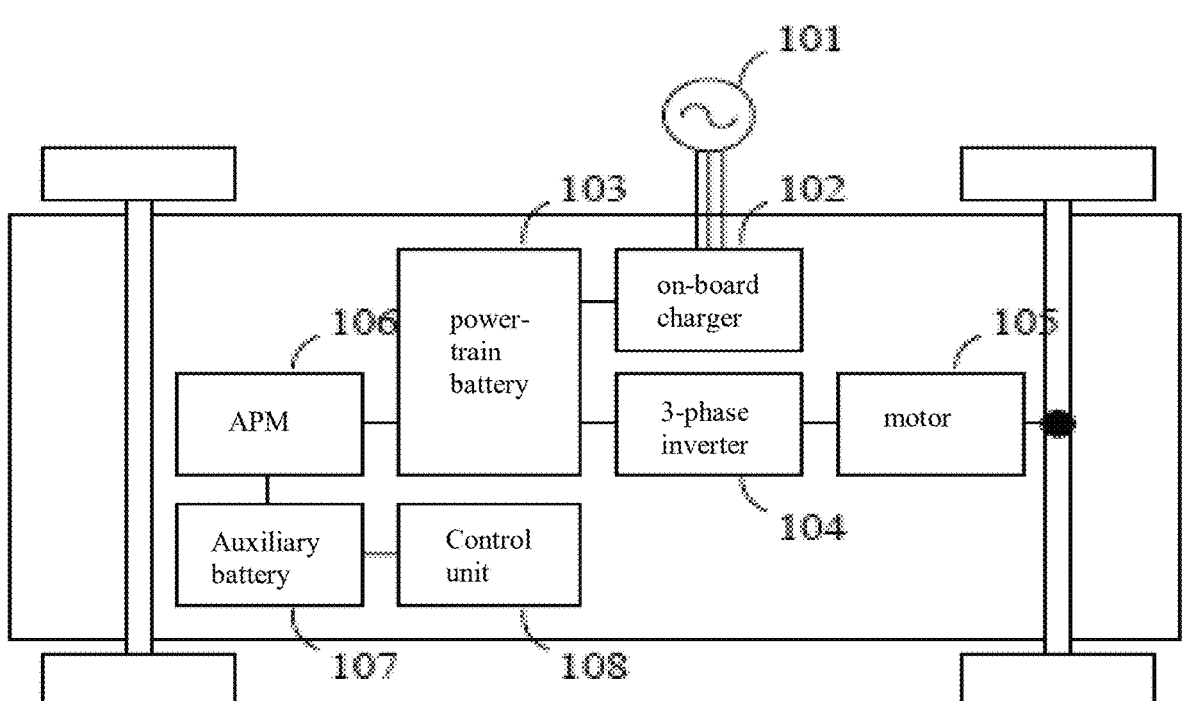

The above described aspects will now be described with respect to various embodiments illustrated in the enclosed drawings.

The features of these embodiments may be combined with each other unless specified otherwise.

The drawings are to be regarded as being schematic representations and elements illustrated in the drawings are not necessarily shown to scale. Rather, the various elements are represented such that their function and general purpose become apparent to a person skilled in the art.

FIG. 1 illustrates an exemplary EV architecture 1.

In a charging mode of the EV architecture 1, a three-phase AC input 101 feeds electric power to an on-board charger 102, which in turn supplies the electric power to a high-voltage powertrain battery 103, where the electric power is stored temporarily.

In a traction mode of the EV architecture 1, a three-phase inverter 104 taps the energy stored in the powertrain battery 103 to supply an electric motor 105 which converts the electric power to torque applied to a drive axle of the EV.

In both charging and traction modes, an auxiliary power module (APM) 106 taps the energy stored in the powertrain battery 103, converts the high voltage down to a low voltage, such as 12 volts (V), and supplies the electric power to a low-voltage auxiliary battery 107, where the electric power is stored temporarily. A control unit 108 of the powertrain of the EV taps the energy stored in the auxiliary battery 107 to ensure its own operation.

EV architectures such as the one shown in FIG. 1 rely on physically separated charging 102 and traction 104, 105 functions. The charging 102 function is on-board all the time, requires dedicated space, needs to be carried within the car while the car is moving, and fails to provide any added functionality.

As will be explained in the following, the disclosure aims to combine the charging and traction functions, regardless of single-phase or three-phase charging operation.

Figure 2:
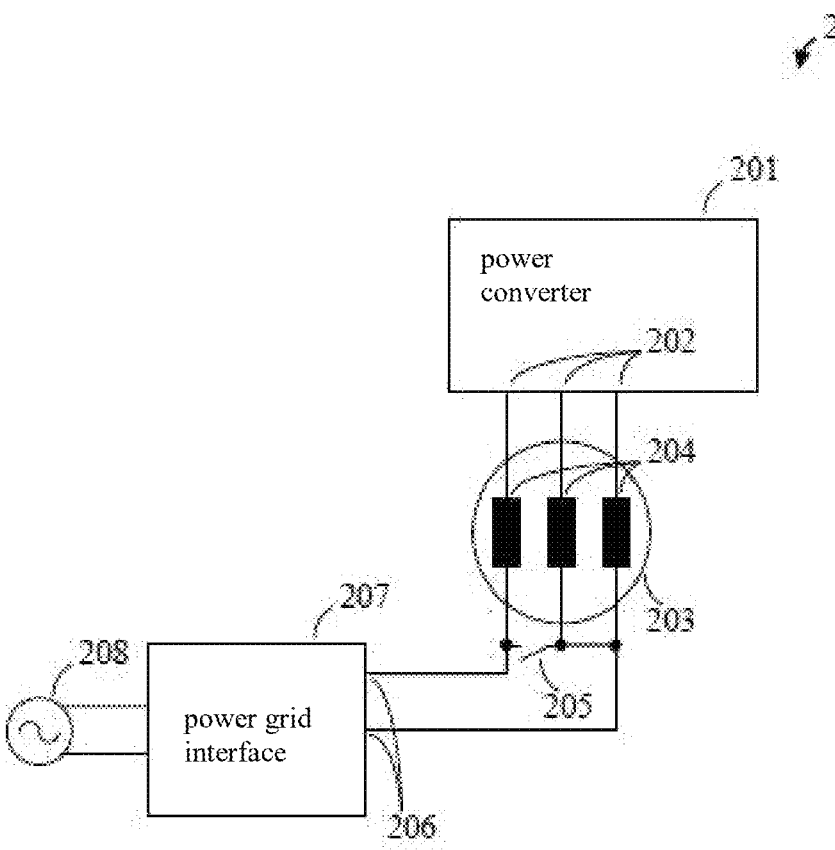
FIG. 2 illustrates an arrangement according to an example of the disclosure for single-phase charging.

FIG. 2 illustrates an arrangement 2 according to an example of the disclosure for single-phase charging.

The arrangement 2 comprises a power converter 201, an electric motor 203, and a power switch 205.

The power converter 201 comprises three legs 202, corresponding to three cells of the multi-cell power converter 201.

The electric motor 203 includes three open-end stator windings 204 respectively having first and second ends.

"Open-end" as used herein may refer to inner terminals of the electric motor 203 being accessible and reconfigurable.

The electric motor 203 is an induction motor or a permanent magnet synchronous machine.

These configurations improve a customizability to various EV requirements.

The first ends of the stator windings 204 are connected to respective legs 202 of the three legs 202 of the power converter 201, and the second ends of the stator windings 204 are connected together and have a same electric potential. The power switch 205 is configured to selectively disconnect one of the second ends of the stator windings 204 from all other of the second ends to establish at most two distinct electric potentials. In other words, the power switch 205 may be open/non-conductive, as is shown in FIG. 2, or may be closed/conductive. Depending on the state of the power switch 205, at most two distinct electric potentials may be established at the second ends of the stator windings 204. The established electric potentials of the second ends of the stator windings 204 are connected to respective legs 206 of a power grid interface 207 that is connected to the arrangement 2 for charging purposes.

In the embodiment of FIG. 2, the power switch 205 is configured to disconnect one of the second ends of the stator windings 204 from all other of the second ends to establish two distinct electric potentials. That is to say, the power switch 205 is open/non-conductive. The established two distinct electric potentials of the second ends of the stator windings 204 are connectable to the respective legs 206 of the power grid interface 207.

This configuration enables a charging mode of the EV in connection with a single-phase power grid 208.

The power switch 205 may be placed between the motor phases a and b, or between the motor phases b and c. In other words, the working principle of the arrangement does not change according to the position of the switch. The same applies to grid insertion of the electric motor 203, as all possible combinations of grid insertion are possible in charging mode.

The power converter 201 is configured to regulate an electric parameter, such as a voltage or a current, on a demand side of the power converter 201. With that said, the demand side actually depends on a mode of operation of the arrangement 2.

If the arrangement 2 is operated in a charging mode, the arrangement 2 attempts to meet a demand of an energy storage 502 (not shown, see FIG. 5), such that the demand side is the side of the power converter 201 interfacing with (or facing towards) the energy storage 502.

By contrast, if the arrangement 2 is operated in a traction/ drive mode, the arrangement 2 attempts to meet a demand of the electric motor 203 for generating a desired amount of torque. In such case, the demand side is the side of the power converter 201 interfacing with the electric motor 203.

This configuration enables a bidirectional operation of the power converter 201 and the arrangement 2. As such, the arrangement 2 is able to charge an energy storage 502, such as a battery, from the power grid 208, and to use the stored electric power to produce torque. Moreover, the arrangement 2 is even able to return the stored electric power to the power grid 208, if needed.

Figure 3:
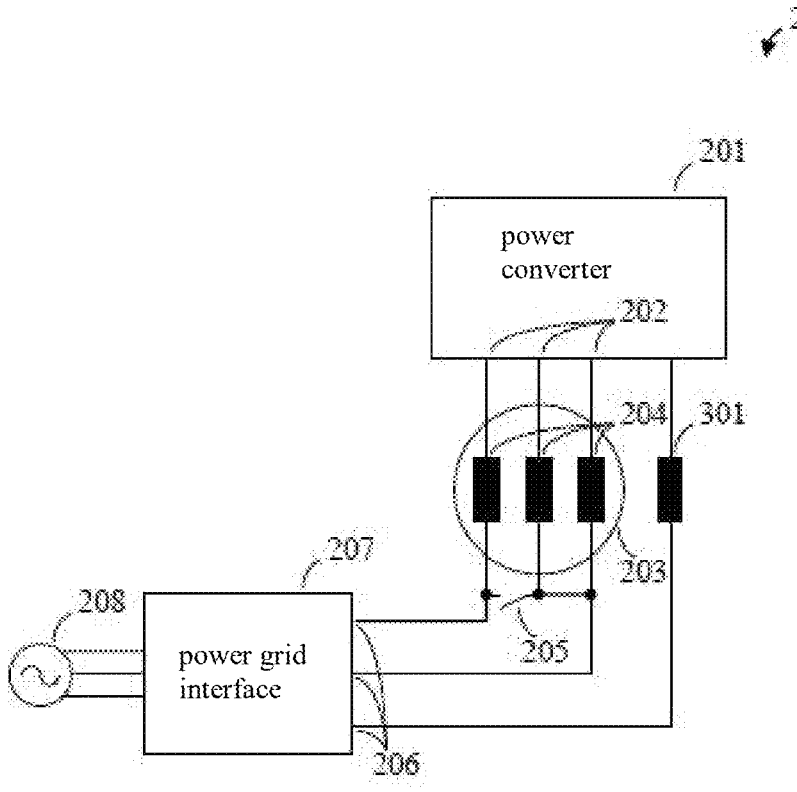
FIG. 3 illustrates an arrangement according to an example of the disclosure for three-phase charging.

FIG. 3 illustrates an arrangement 2 according to an example of the disclosure for three-phase charging.

The arrangement 2 of FIG. 3 corresponds to the embodiment of FIG. 2, with the exception that the arrangement 2 of FIG. 3 further comprises an inductor 301 having first and second ends. The first end of the inductor 301 is connected to a further leg of the power converter 201, which corresponds to a fourth cell of the multi-cell power converter 201, and the second end of the inductor 301 is connectable to a further leg of the power grid interface 207.

To avoid torque production in the electric motor 203, one of the three stator windings 204 is disconnected from the common point by opening the power switch 205. The decoupled stator winding 204 is then connected to a leg 206 of the power grid interface 207. A second leg 206 of the power grid interface 207 is connected to the remaining two stator windings 204, where the phase current is equally split among them. In this way, no torque is produced by the electric motor 203 during charging. A third and last leg 206 of the power grid interface 207 is connected to the inductor 301, which is in turn connected to a further/fourth leg of the power converter 201.

This configuration enables a charging mode of the EV in connection with a three-phase power grid 208 without producing any torque, making use of all the power electronics already existing for the traction system and the motor inductances. This saves space and increases power density, efficiency and reliability.

The inductor 301 has a same inductance as the stator windings 204, although the arrangement 2 is configured to work—depending on the case, in a suboptimal manner— with any inductance value of the inductor 301. In a fault-tolerant traction mode (see FIG. 6 below), a smaller inductance as the stator windings 204 may improve operations by extending torque and speed limits. In a single-phase charging mode (see FIG. 4 below), a higher inductance as the stator windings 204 would lead to a reduced harmonic distortion of a grid current. On the other hand, in a three-phase charging mode (see FIG. 3), an inductance different from the inductance of the stator windings 204 might result in an unbalance on the current harmonic distortion among the grid currents.

Therefore, an inductance equal to the inductance of the stator windings 204 provides a reasonable trade-off in view of the different modes of operation of the arrangement.

Figure 4:
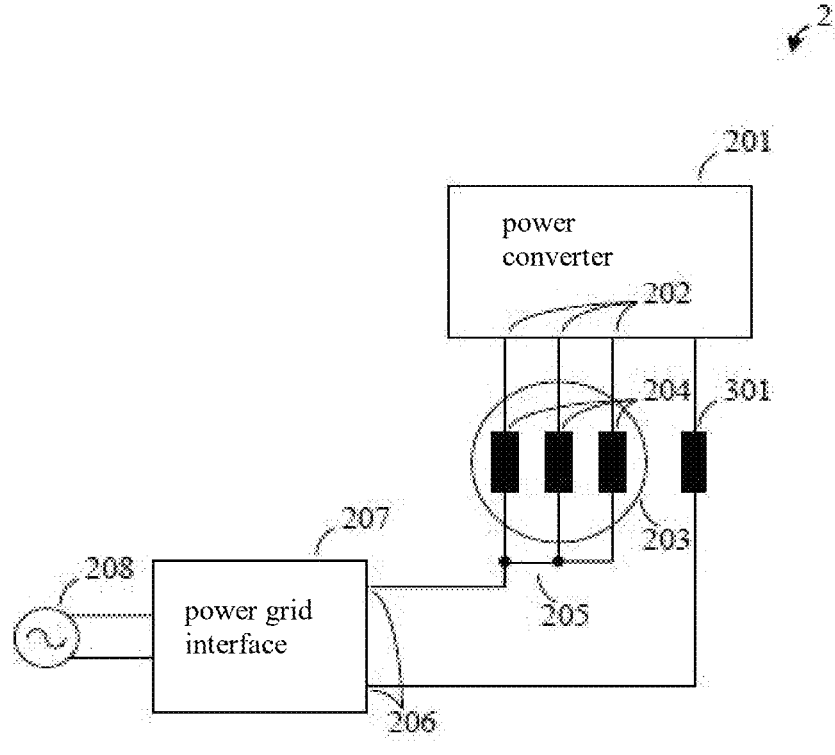
FIG. 4 illustrates an arrangement according to another example of the disclosure for single-phase charging.

FIG. 4 illustrates an arrangement 2 according to another example of the disclosure for single-phase charging.

The arrangement 2 of FIG. 4 corresponds to the embodiment of FIG. 3, with the exception that in the arrangement 2 of FIG. 4, the power switch 205 is configured to disconnect none of the second ends of the stator windings 204 from all other of the second ends to establish a single electric potential. In other words, the power switch 205 is closed/ conductive, and the motor windings 204 are connected as in traction-mode.

The established single electric potential of the second ends of the stator windings 204 is connected to one of the respective legs 206 of the power grid interface 207. At an input of the power grid interface 207, a single-phase grid 208 is connected. That is to say, the common connection point of the electric motor 203 is connected to one terminal of the AC power grid 208 through the power grid interface 207.

In this way, the grid current is equally split among the motor windings 204 and no torque is produced. The second and last terminal of the single-phase AC grid 208 is connected to the inductor 301, which is then connected to the further/fourth leg of the power converter 201.

This configuration enables a further charging mode in connection with a single-phase power grid 208.

Figure 5:
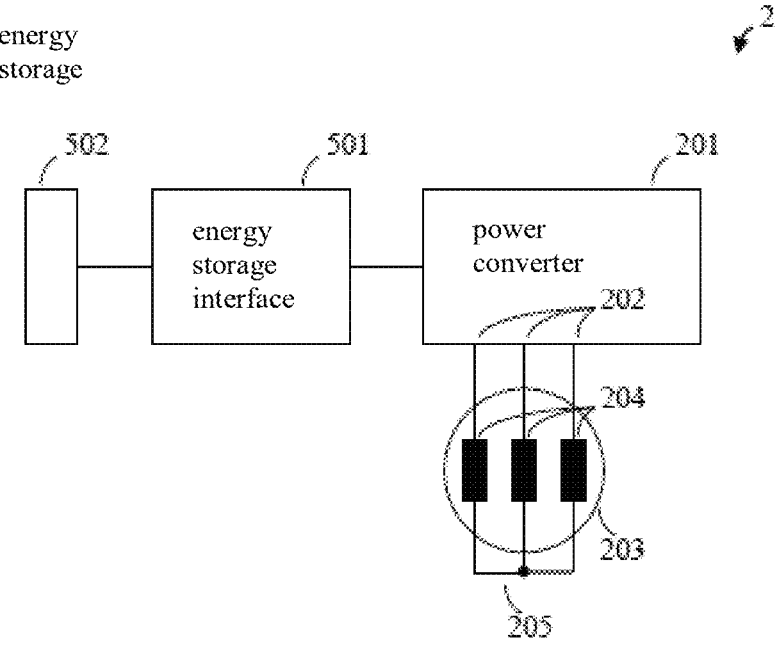
FIG. 5 illustrates an arrangement according to an example of the disclosure for torque (i.e., drive) production.

FIG. 5 illustrates an arrangement 2 according to an example of the disclosure for torque (i.e., drive) production.

An energy storage interface 501 is connected to the power converter 201 of the arrangement 2 via a multi-wire connection, and an energy storage 502 is connected to the energy storage interface 501.

There are no restrictions on the type of energy storage 502, as well as no restriction on its electrical ratings (voltage and current).

The main purpose of the energy storage interface 501 is to provide the necessary functions to interface the energy storage 502 and the power converter 201.

Torque or traction is produced if the power converter 201 taps the energy stored in the energy storage 103 via the energy storage interface 501 to supply the electric motor 203, while the power switch 205 is conductive. In other words, the power switch 205 is closed to allow the motor windings 204 to be in the so-called "star configuration".

The established single electric potential of the second ends of the stator windings 204 (i.e., the neutral point of the electric motor 203) is not connected to any of the respective legs 206 of the power grid interface 207 (not shown).

In this configuration, three legs 202 of the power converter 201 are configured to control the currents supplied to the electric motor 203, in order to provide the torque requested by a control unit of the EV. The fourth leg of the power converter 201 and the inductor 301 are not involved in this configuration. However, it is evident that torque production is also possible in embodiments of the arrangement 2 that involve the inductor 301.

This configuration enables a traction mode of the EV.

The power converter 201 is operable according to a direct torque control (DTC), field-oriented control (FOC), model predictive control (MPC), or open-loop control strategy, and is configured to regulate a torque of the electric motor 203 according to a torque reference.

In charging modes, regulation objectives may comprise DC link voltage regulation, or DC link current regulation.

These configurations improve a customizability to various EV requirements.

Figure 6:
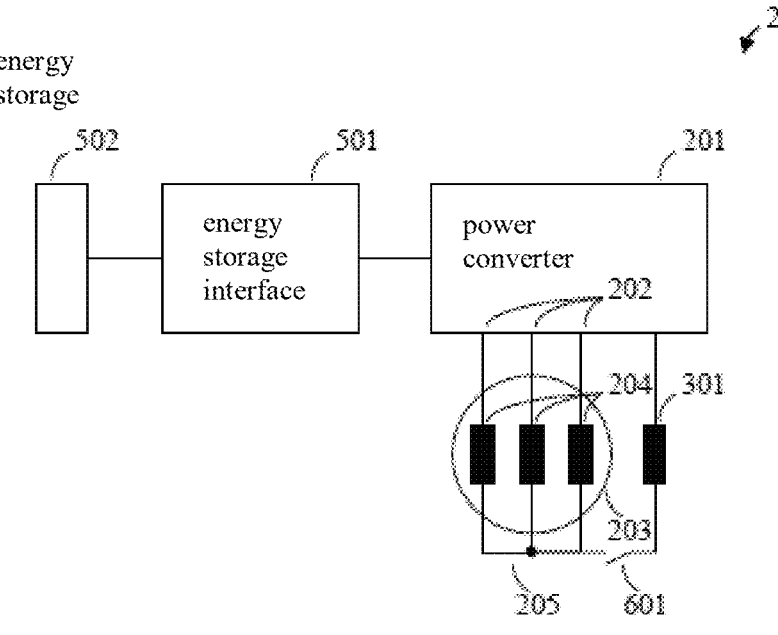
FIG. 6 illustrates an arrangement according to the example of the disclosure for torque production with added fault tolerance.

FIG. 6 illustrates an arrangement 2 according to the example for torque production with added fault tolerance.

The arrangement 2 of FIG. 6 corresponds to the embodiment of FIG. 5, with the exception that the arrangement 2 of FIG. 6 further comprises a further power switch 601 being configured to connect the second end of the inductor 301 with the established single electric potential of the second ends of the stator windings 204.

This configuration extends the possibilities of connection in traction mode. By means of connecting the neutral point of the motor to the inductor 301, a reduction of common mode (CM) current may be achieved, as well as fault tolerance.

Figure 7:
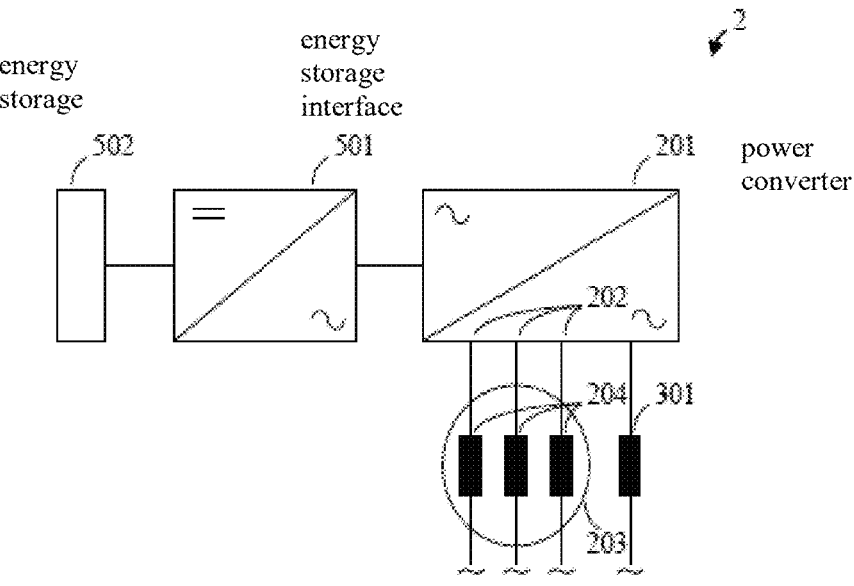
FIG. 7 illustrates an arrangement according to an example of the disclosure including an AC/AC power converter.

FIG. 7 illustrates an arrangement 2 according to an example of the disclosure including an AC/AC power converter 201.

The power converter 201 of FIG. 7 is configured to perform AC/AC power conversion. To this end, the first ends of the stator windings 204 may be connected to the respective legs 202 of an AC side of the power converter 201.

Just as shown in FIGS. 5 and 6, an energy storage interface 501 is connected to the AC/AC power converter 201, and an energy storage 502 is connected to the energy storage interface 501. Since the energy storage 502 is a DC device, such as a high-voltage powertrain battery, the energy storage interface 501 is configured to mediate between the energy storage 502 and the AC/AC power converter 201. In other words, the energy storage interface 501 is an AC/DC device, as shown in FIG. 7.

Figure 8:
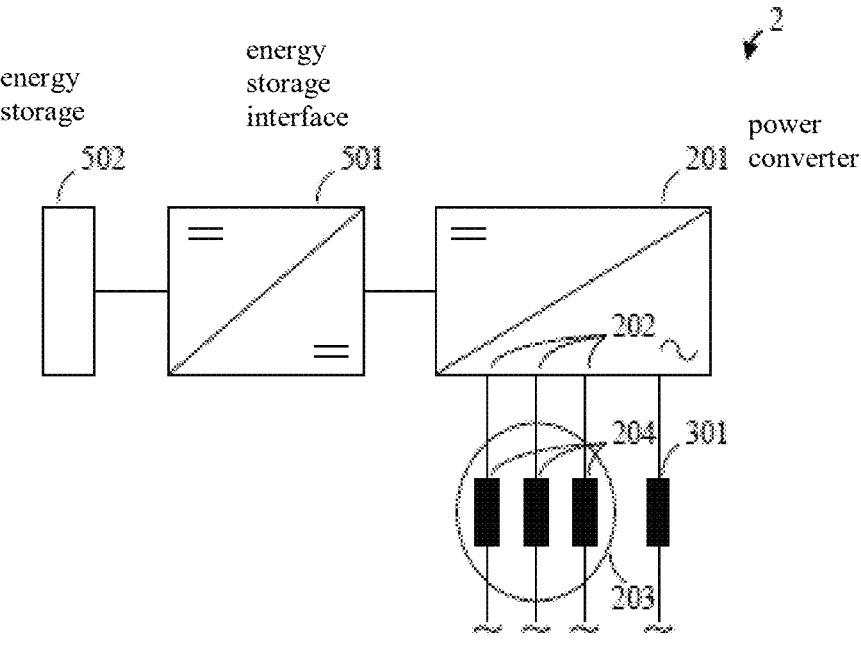
FIG. 8 illustrates an arrangement according to an example of the disclosure including an AC/DC power converter.

FIG. 8 illustrates an arrangement 2 according to an example of the disclosure including an AC/DC power converter 201.

The arrangement 2 of FIG. 8 corresponds to the embodiment of FIG. 7, with the exception that in the arrangement 2 of FIG. 8, the power converter 201 is configured to perform AC/DC power conversion. To this end, the first ends of the stator windings 204 may be connected to the respective legs 202 of the AC side of the power converter 201.

In the embodiment of FIG. 8, the energy storage interface 501 is configured to mediate between the energy storage 502, which is a DC device, and the DC side of the AC/DC power converter 201. In other words, the energy storage interface 501 is a DC/DC device, as shown in FIG. 7.

The energy storage interface 501 may be omitted if the energy storage 502 and the AC/DC power converter 201 match in terms of DC voltage.

The configurations of FIGS. 7 and 8 improve a customizability to various EV requirements.

Figure 9:
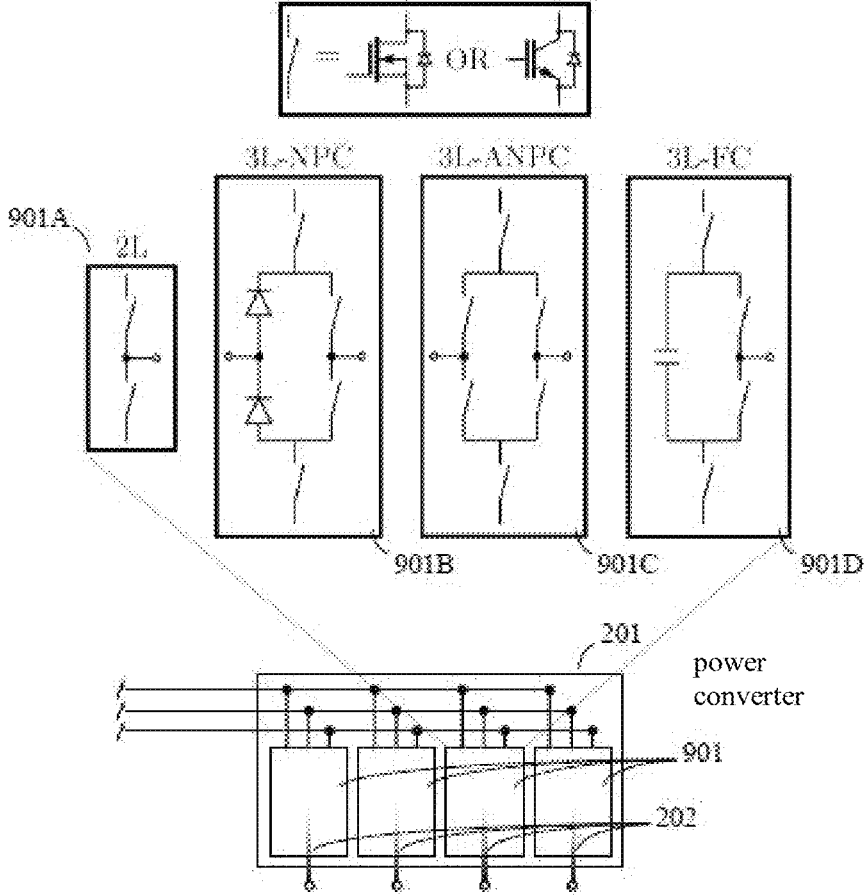
FIG. 9 illustrates a general scheme of a power converter of an arrangement according to an example of the disclosure.

FIG. 9 illustrates a general scheme of a power converter 201 of an arrangement 2 according to an example of the disclosure.

The power converter 201 schematically suggested in a lower part of FIG. 9 comprises a parallel connection—on the same rails—of four (in the general case at least three) independently controlled half-bridges 901. These half-bridges 901 expose/provide the respective legs 202 of the power converter 201.

This configuration enables a modular multi-cell architecture of the power converter.

Each of the independently controlled half-bridges 901 is configured to convert DC voltage to AC voltage by alternating between various DC voltage levels. The resulting AC voltage is non-sinusoidal, but designed to approximate a sinusoidal AC voltage as close as possible.

For example, the power converter 201 may comprise a parallel connection of four (i.e., at least three) independently controlled two-level (2 L) half-bridges 901A, as indicated on a left side of a middle part of FIG. 9. Such a 2 L half-bridge 901A may comprise a series connection of power switches.

This configuration based on 2 L half-bridges is configured to alternate between two levels of DC voltages such as $+V_{DC}/2$ and $-V_{DC}/2$, which implies a low circuit complexity. 2 L half-bridges are particularly suitable for moderate-voltage applications.

Alternatively, the power converter 201 may comprise a parallel connection of four (i.e., at least three) independently controlled n-level (nL) half-bridges 901A-901C, wherein a number n of DC voltage levels exceeds two. Various kinds of three-level (3 L) half-bridges 901A-901C are indicated on a right side of a middle part of FIG. 9.

This configuration based on 3 L half-bridges is configured to alternate between three levels of DC voltages such as $+V_{DC}/2$, 0, and $-V_{DC}/2$. The additional zero-voltage level reduces a loss and stress of switching components. As such, 3 L half-bridges are particularly suitable for high-voltage applications.

As a first example, a 3 L-neutral point clamped (NPC) half-bridge 901B may comprise a 2 L half-bridge as mentioned above, connected in parallel to a series connection of diodes for clamping the neutral point, wherein this parallel connection is enclosed serially by additional power switches.

As a second example, a 3 L-active NPC (ANPC) half-bridge 901C may comprise two 2 L half-bridges as mentioned above connected in parallel, wherein this parallel connection is enclosed serially by additional power switches.

This configuration based on 3 L-ANPC half-bridges 901C may "enforce" switching losses to occur on specific power switches of the half-bridge, which improves an overall efficiency.

As a third example, a 3 L-flying capacitor (FC) half-bridge 901D may comprise a 2 L half-bridge as mentioned above and connected in parallel to a flying capacitor, wherein this parallel connection is enclosed serially by additional power switches.

In particular, the number n of levels may be extended from 3 to N for all the three-level configurations.

Each of the above-mentioned independently controlled half-bridges 901 may in turn be composed of parallel connected, dependently controlled half-bridges (with the goal of splitting an output current of the half-bridge 901).

In an upper part of FIG. 9, it is indicated the power switches forming the afore-mentioned half-bridges 901 may comprise bipolar transistors or field effect transistors (FETs).

Figure 10:
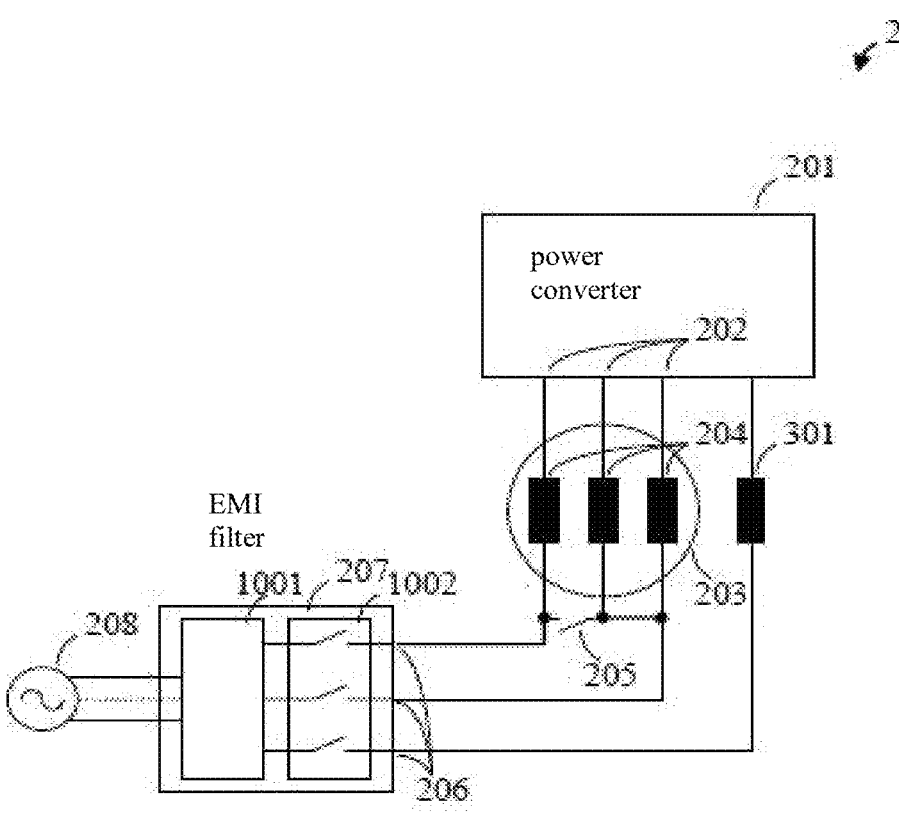
FIG. 10 illustrates a general scheme of a power grid interface connectable to an arrangement according to an example of the disclosure.

FIG. 10 illustrates a general scheme of a power grid interface 207 connectable to an arrangement 2 according to an example of the disclosure.

The arrangement 2 of FIG. 10 is connectable to the power grid interface 207, which comprises an EMI filter 1001 and an all-pole grid cutoff switch 1002 exposing/providing the respective legs 206 of the power grid interface 207.

This configuration improves EMI suppression and a safety of operation in charging modes of the EV.

Figure 11:
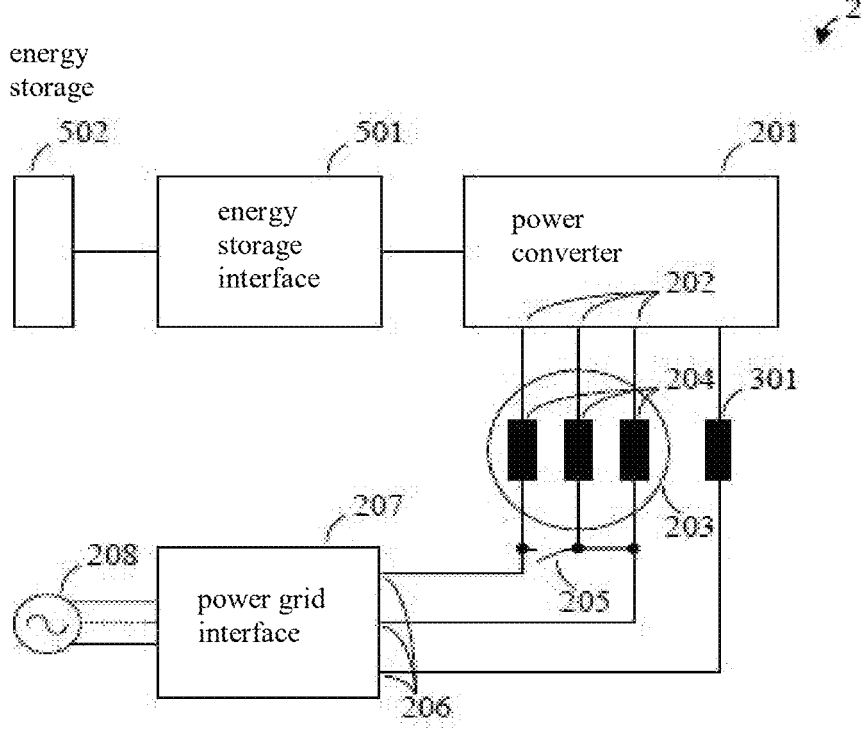
FIG. 11 illustrates a system according to an example of the disclosure.

FIG. 11 illustrates a system according to an example of the disclosure.

The system comprises an arrangement 2 according to the first aspect of the disclosure or any of its embodiments, a power grid interface 207 connected to the electric motor 203 of the arrangement 2, an energy storage interface 501 connected to the power converter 201 of the arrangement 2, and an energy storage 502 connected to the energy storage interface 501.

The system of FIG. 11 enables replacing the corresponding arrangement of FIG. 1 consisting of the on-board charger 102, the powertrain battery 103, the three-phase inverter 104 and the electric motor 105.

A comparison of FIGS. 1 and 11 reveals that the on-board charger 102 of FIG. 1 is merged into the electric motor 203, the inductor 301 and the fourth cell of the power converter 201 shown in FIG. 11.

The system enables charging the energy storage of an EV, such as a battery, from the power grid, using the stored electric power to produce torque, and even returning the stored electric power to the power grid, if needed.

Figure 12:
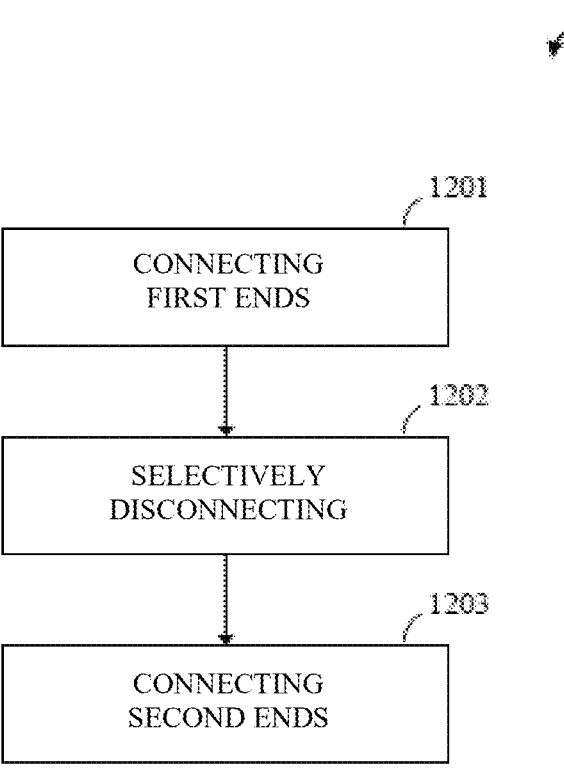
FIG. 12 illustrates a flow chart of a method according to an example of the disclosure of operating an arrangement.

FIG. 12 illustrates a flow chart of a method 12 according to an example of the disclosure of operating an arrangement 2.

The method 12 is for operating an arrangement 2 for electric power conversion and electric drive, which comprises a power converter 201, an electric motor 203 and a power switch 205. The power converter 201 comprises three legs 202, corresponding to three cells of the multi-cell power converter 201. The electric motor 203 includes three open-end stator windings 204 respectively having first and second ends. The second ends of the stator windings 204 are connected together and have a same electric potential. The power switch 205 is configured to selectively disconnect one of the second ends of the stator windings 204 from the star configuration to establish at most two distinct electric potentials.

The method 12 comprises connecting 1201, selectively disconnecting 1202 and connecting 1203 steps.

A first step involves connecting 1201 the first ends of the stator windings 204 to respective legs 202 of the three legs 202 of the power converter 201.

A second step involves selectively disconnecting 1202 one of the second ends of the stator windings 204 from all other of the second ends to establish at most two distinct electric potentials.

A third step involves connecting 1203 the established at most two distinct electric potentials of the second ends of the stator windings 204 to respective legs 206 of a power grid interface 207 connectable to the arrangement 2.

This enables a charging mode of the EV in connection with a three-phase power grid without producing any torque, making use of all the power electronics already existing for the traction system and the motor inductances. This saves space and increases power density, efficiency and reliability.

The method 12 comprises utilizing the arrangement 2 according to the first aspect or any of its embodiments.

As a consequence, the above-mentioned device features and the associated advantages also apply in connection with the method 12 according to the third aspect by analogy.

The processor or processing circuitry of the of the arrangement 2 may comprise hardware and/or the processing circuitry may be controlled by software. The hardware may comprise analog circuitry or digital circuitry, or both analog and digital circuitry. The digital circuitry may comprise components such as application-specific integrated circuits (ASICs), field-programmable gate arrays (FPGAs), digital signal processors (DSPs), or multi-purpose processors.

The arrangement 2 may further comprise memory circuitry, which stores one or more instruction(s) that can be executed by the processor(s) or by the processing circuitry, in particular under control of the software. For instance, the memory circuitry may comprise a computer program (not shown) comprising a program code for carrying out the method 12 according to the third aspect of the disclosure or any of its embodiments when implemented on processor(s) of the arrangement 2 according to the first aspect or any of its embodiments.

The disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A system for electric power conversion and electric drive comprising:
   a power converter comprising three first legs;
   an electric motor comprising three open-end stator windings, wherein each of the three open-end stator windings comprises a first end and a second end, wherein first ends of the three open-end stator windings are coupled to respective first legs of the three first legs, and wherein second ends of the three open-end stator windings are coupled together and have a same electric potential; and
   a power switch coupled to the electric motor and configured to selectively disconnect one of the second ends from all other of the second ends to establish at most two distinct electric potentials,
   wherein the at most two distinct electric potentials are configured to couple to respective second legs of a power grid interface to the system.

2. The system of claim 1, further comprising an inductor comprising:
   a third end coupled to a third leg; and
   a fourth end configured to couple to a fourth leg of the power grid interface.

3. The system of claim 2, wherein the inductor comprises a same inductance as the three open-end stator windings.

4. The system of claim 1, wherein the two distinct electric potentials consist of two distinct electric potentials.

5. The system of claim 1, wherein the power switch is further configured to disconnect none of the second ends to establish a single electric potential.

6. The system of claim 5, wherein the single electric potential is configured to couple to one of the respective second legs.

7. The system of claim 1, wherein the power converter further comprises a demand side and is configured to regulate an electric parameter on the demand side.

8. The system of claim 5, wherein the single electric potential is not coupled to the respective second legs.

9. The system of claim 8, wherein the power converter is configured to:
   operate according to a direct torque control (DTC), field-oriented control (FOC), model predictive control (MPC), or an open-loop control strategy; and
   regulate a torque of the electric motor according to a torque reference.

10. The system of claim 8, further comprising:
    an inductor comprising a third end; and
    a second power switch configured to couple the third end with the single electric potential.

11. The system of claim 1, wherein the power converter further comprises an alternating current (AC) side and is configured to perform AC/AC power conversion, and wherein the first ends are coupled to the respective first legs on the AC side.

12. The system of claim 1, wherein the power converter further comprises an alternating current (AC) side and is configured to perform AC/direct current (DC) power conversion, and wherein the first ends are coupled to the respective first legs on the AC side.

13. The system of claim 1, wherein the power converter further comprises a first parallel connection of at least three independently controlled half-bridges providing the respective first legs.

14. The system of claim 13, wherein the power converter further comprises a second parallel connection of at least three independently controlled two-level (2L) half-bridges.

15. The system of claim 13, wherein the power converter further comprises a second parallel connection of at least three independently controlled n-level (nL) half-bridges, and wherein n of levels exceeds two.

16. The system of claim 1, wherein the system is configured to couple to an electromagnetic interference (EMI) filter and an all-pole grid cutoff switch of the power grid interface providing the respective second legs.

17. The system of claim 1, wherein the electric motor is an induction motor or a permanent magnet synchronous machine.

18. A first system comprising:
a second system comprising:
    a power converter comprising three first legs;
    an electric motor comprising three open-end stator windings, wherein each of the three open-end stator windings comprises a first end and a second end, wherein first ends of the three open-end stator windings are coupled to respective first legs of the three first legs, and wherein second ends of the three-open end stator windings are coupled together and have a same electric potential; and
    a power switch configured to selectively disconnect one of the second ends from all other of the second ends to establish at most two distinct electric potentials;
a power grid interface coupled to the electric motor and comprising second legs coupled to at most two distinct electric potentials;
an energy storage interface coupled to the power converter; and
an energy storage configured to couple to the energy storage interface.

19. The first system of claim 18, wherein the power grid interface further comprises a fourth leg, and wherein the second system further comprises an inductor comprising:
    a third end configured to couple to the third leg; and
    a fourth end configured to couple to the fourth leg.

20. A method of operating a system for electric power conversion and electric drive, wherein the method comprises:
connecting first ends of stator windings to respective first legs of three first legs of a power converter, wherein the system comprises the power converter and an electric motor, wherein the electric motor comprises the stator windings;
connecting a third leg of the power converter to an inductor of the system;
selectively disconnecting one of second ends of the stator windings from all other of the second ends to establish at most two distinct electric potentials; and
coupling the at most two distinct electric potentials to respective second legs of a power grid interface to the system.

\*　\*　\*　\*　\*